May 19, 1925.
W. R. SMITH
SUBSOIL TILE LINE
Filed Feb. 2, 1924
1,538,669
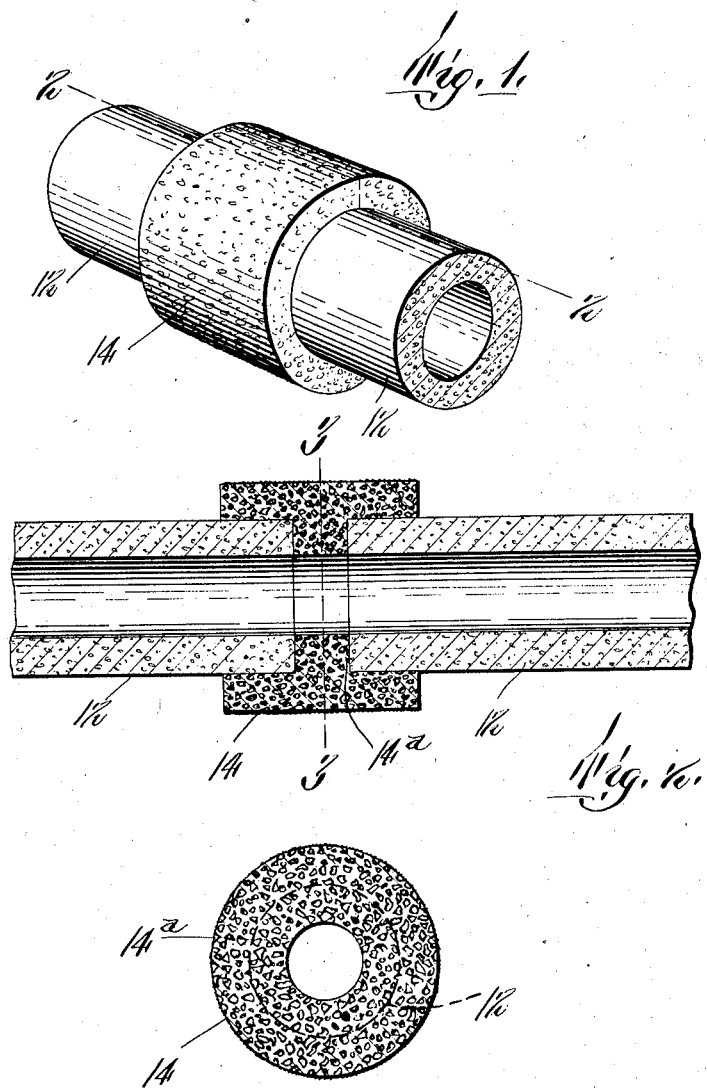
Inventor:
William R. Smith.
by [signature]
attys.

Patented May 19, 1925.

1,538,669

UNITED STATES PATENT OFFICE.

WILLIAM R. SMITH, OF BUFFALO, NEW YORK.

SUBSOIL TILE LINE.

Application filed February 2, 1924. Serial No. 690,317.

*To all whom it may concern:*

Be it known that I, WILLIAM R. SMITH, a citizen of the United States, residing at Buffalo, in the county of Erie and State of New York, have invented new and useful Improvements in Subsoil Tile Lines, of which the following is a specification.

This invention relates to tiles for the drainage and irrigation of land, a line of the tiles being laid end to end underground. When the tiles have walls which are practically impermeable by water, as is the case in ordinary vitrified or cement tiles, their adjacent ends do not abut closely against each other, and form leaky joints, constituting lateral passages to conduct water into or out of the line. It is difficult, if not impossible, to adequately protect these joints against obstruction by root growths and other matter, particularly when the adjacent ends are somewhat widely spaced apart, to provide lateral passages of adequate capacity.

The object of the invention is to enable the adjacent ends of the tiles to be spaced any desired distance apart, and to prevent the entrance of roots and other obstructing matter into the space, without preventing a sufficiently rapid lateral flow of water to or from the line.

I attain this object as hereinafter described and claimed.

Of the accompanying drawings forming a part of this specification,—

Figure 1 is a perspective view, showing portions of two alined tiles and the porous coupling sleeve hereinafter described, connecting said tiles.

Figure 2 is a section on line 2—2 of Figure 1.

Figure 3 is a section on line 3—3 of Figure 2.

The same reference characters indicate the same parts in all of the figures.

12, 12 designate portions of two alined tubular tiles which may be of any desired form and material, or composition. They may be ordinary vitrified or cement, such as are in common use. The tiles are assembled with their adjacent ends preferably about one inch apart, to form an intermediate space between said ends. 14 designates a tubular porous coupling sleeve, formed internally to receive and overlap end zones of the peripheries of said tiles, and to extend across the intermediate space, as shown by Figure 2, so that water, either entering or leaving the line of tiles in a lateral direction, must pass through the wall of the coupling sleeve. The porosity of the sleeve is such that water may seep freely through its wall, either inward or outward, and its density is such that root growths cannot penetrate the wall. In other words, the sleeve is permeable by water and impermeable by roots. The sleeve is preferably provided with a thickened central portion 14$^a$ interposed between the ends of the tiles and holding said ends spaced apart.

A sleeve characterized as above stated, may be made like the tubular tile disclosed by my United States Patent Number 1,483,689, dated February 12, 1924.

In making the sleeve I form a mixture of ingredients including hard porous coarse material in the form of lumps or fragments which may be of various sizes, powdered material and hydraulic cement, such as the well known Portland cement. To the mixture I add sufficient water to crystallize the cement. The mixture is molded while plastic and before the crystallization of the cement, into a tubular sleeve of any suitable form, the sleeve being subsequently solidified by the crystallization of the cement.

The preferred ingredients, other than the cement, are preferably the cinders and ashes constituting the solid products of combustion of coal. The larger cinder are reduced by crushing, so that the greatest dimension of any lump is approximately one inch or less, although this dimension may be varied within reasonable limits. Some of the lumps may be considerably smaller. The spaces between the lumps are filled by the ashes and the cement.

I find that satisfactory results may be produced by using the ingredients in the proportion of about one-sixth by weight of the cement, to about five-sixths by weight of a mixture of cinders and ashes, the relative proportions of the cinders and the ashes being as usually found in the ash pit of a furnace. In some cases the proportion of cinders is greater, and in other cases less than the proportion of ashes.

The cinders resulting from the combustion of coal are so porous that water can percolate very freely through them and through the wall of a sleeve made as above described. Some of the cinders are flush with the external surface, and others with the internal surface of the tile. The intermediate cinders contact at frequent points with each other and with the surface cinders, so that water may seep through the cinders without being obstructed by the cement. The mixture of cement and ashes is also porous.

I have found that the finer material or ashes, and the hydraulic cement, constitute a porous binder which adheres firmly to the rigid lumps or cinders, and fills the interstices therebetween, so that the wall of the sleeve does not contain open spaces between the lumps, and is characterized by uniform porosity, uniform density, and absence of crevices into which roots may find their way and uniform rigidity or resistance to crushing pressure, throughout any section of the sleeve. In other words, if the sleeve were cut in two, either longitudinally or transversely, the faces formed by the cut would be solid and continuous, and would have no pits, depressions, or passages, such as would appear if the wall of the tile contained open spaces, hence the sleeve is impermeable by roots.

It is essential that the cement employed be hydraulic cement. The crystallization of this cement, caused by the reaction of water thereon, imparts rigidity to the binder, without interfering with its porosity, and causes the firm adhesion of the binder to the lumps.

It will be seen that the sleeve has relatively thin annular end portions forming the walls of sockets adapted to receive the adjacent ends of the tiles 12, and a thicker annular central portion 14ª forming the inner ends of the sockets and the wall of a bore adapted to connect the bores of the tiles. The inner surfaces of said end portions and the annular surface formed by the ends of the thicker portion, are adapted to conform closely to the peripheral and end surfaces of the inserted tiles, and form therewith angular joints which are impervious by roots. The sleeve wall is uniformly imperforate so that it also is impervious by roots. Said wall is uniformly porous so that water may seep through it between the spaced apart adjacent ends of the tiles. Provision is, therefore, made for connecting the ends of the tiles at a considerable distance apart so that water may pass freely in lateral directions between said ends, and for preventing the entrance of roots between the ends of the tiles.

I do not limit myself to the sleeve composition above described, and may employ any other suitable composition.

I claim:

As an article of manufacture a tubular porous coupling sleeve having relatively thin end portions of maximum internal diameter, the inner surfaces of said portions forming the walls of sockets adapted to receive and closely fit the peripheries of two aligned tubular tiles, and a thicker central portion of a smaller internal diameter, the ends of said thicker portion forming the inner ends of said sockets and being adapted to closely fit the end faces of said tiles, so that the internal surfaces of the end portions and the ends of the thicker portion are adapted to cooperate with the peripheral portions and end faces of the tiles in forming angular joints, the sleeve being characterized by the fact that its wall is uniformly imperforate and uniformly porous so that the said wall and the said angular joints are impervious by roots, and the thickened portion of the sleeve is adapted to space the tile ends apart and permit the seepage of water between said ends.

In testimony whereof I have affixed my signature.

WILLIAM R. SMITH.